United States Patent Office 3,250,779

Patented May 10, 1966

3,250,779

PRODUCTION OF AMIPHENAZOLE

Bert Halpern, Campbell, Australian Capital Territory, and Ronald W. Hinde, Ashwood, Victoria, Australia, assignors to Monsanto Chemicals (Australia) Limited, a company of Victoria, Australia No Drawing. Filed Mar. 29, 1963, Ser. No. 269,152
Claims priority, application Australia, Mar. 30, 1962, 16,008/62
10 Claims. (Cl. 260—306.8)

This invention relates to the production of 2,4-diamino-5-phenyl thiazole hydrochloride or hydrobromide, the hydrochloride salt being represented by the structural formula:

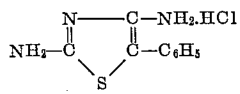

and having the short name "Amiphenazole." Amiphenazole is useful medicinally as an analeptic having marked stimulant action on the respiratory centre; the substance has also been proposed to be used in conjunction with bemegride (β-methyl-β-ethyl glutarimide) in the treatment of barbiturate poisoning, especially in the treatment of severe poisoning from long-acting barbiturates; the substance is also an effective antagonist of morphine and the natural and synthetic analgesics; the substance also counteracts the respiratory depression, vomiting, narcosis and depression of the cough reflex without affecting the analgesia; and, the substance allows the administration of larger doses of morphine and may prevent the development of tolerance, thus being especially of value in terminal carcinoma and during childbirth.

Amiphenazole can be synthesised by reacting together benzaldehyde, benzene or alkylated benzene sulphonyl chloride and sodium cyanide to form α-cyanobenzyl benzene or alkylated benzene sulphonate, then reacting this compound with thiourea to form the benzene or alkylated benzene sulphonate salt of 2,4-diamino-5-phenyl thiazole, which is converted to the free base with ammonia in an aqueous medium and then treated in alcohol with hydrogen chloride to obtain the desired hydrochloride salt. This synthesis is described by R. M. Dodson and M. W. Turner, J.A.C.S., 73 4517 (1951) and in U.S. Patent 2,709,172. In practice, the synthesis proceeds readily with high yields to the stage of the 2,4-diamino-5-phenyl thiazole benzene or alkylated benzene sulphonate salt. Conversion of that salt to the free base and the formation of the hydrochloride, however, introduces two difficulties. The reaction to form the free base is usually by no means complete, there being often relatively large amounts of unchanged benzene or alkylated benzene sulphonate in the product obtained, and, the product obtained contains large amounts of water.

The first of these difficulties is brought about by the inefficiency of the solid-liquid reaction. Both the sulphonate salt and the base have almost no solubility in water and at no time do these materials dissolve. Hence the reaction relies on complete contact of all of the sulphonate salt with the aqueous alkaline medium. Even on small scale this is difficult to achieve, and when the scale is increased it makes the process inefficient to the extreme. A simple test for completeness of reaction is to check the solubility of the product in acetone, since the sulphonate salt is insoluble and the base very soluble in the acetone medium.

The second of these difficulties, namely, the presence of water in the base, affects the conversion of the base to the hydrochloride salt. In the cited description of the synthesis, according to one example, the base is first dried by washing thoroughly with anhydrous ether and then dried in a stream of air; in another example the base is dried in vacuo over phosphorus pentoxide. Neither of these methods have been found to be practical on large scale, and if the wet base is allowed to stand for any length of time, colour develops, which affects the appearance of the final product. Other methods of drying the product have been tried by us but either resulted in extensive decomposition of the base or a poor quality hydrochloride salt. The use of sodium hydroxide or potassium hydroxide as the alkali for conversion of the base appears to hasten the decomposition. This forces use of the base in the wet condition, which causes considerable losses in conversion to the hydrochloride salt, due to its water solubility. In addition, the use of solvents such as alcohol or acetone for the preparation of the hydrochloride salt results in a product which varies in colour. Products so obtained, even if white initially, will often develop colour after storage for a time.

A good yield of pure hydrochloride salt cannot be obtained by conversion of the base to the hydrochloride by slurrying the base in water and adding hydrochloric acid, since, if the volume is kept so low that the hydrochloride is largely precipitated, the product is impure and recrystallisation from water leads to large losses. Again, if the reaction is carried out in the hot condition so that the hydrochloride dissolves and can be carbon treated, then it is found that the temperature gradient of the hydrochloride in water is quite poor. On the other hand, high temperatures have to be used in conjunction with small volumes so that a worthwhile yield may be obtained on cooling. High temperatures, however, invariably lead to the formation of one or more by-products which are regarded as being toxic and tend to make the use of amiphenazole so prepared, medically unacceptable.

The present invention provides a method for the conversion of 2,4-diamino-5-phenyl thiazole to the hydrochloride or hydrobromide salt in good yield and purity. The invention also provides a method for the substantially complete conversion of 2,4-diamino-5-phenyl thiazole benzene or alkylated benzene sulphonate to 2,4-diamino-5-phenyl thiazole and the conversion of that base to 2,4-diamino-5-phenyl thiazole hydrochloride or hydrobromide in good yield and purity.

In accordance with the present invention amiphenazole is prepared by the method which comprises heating an aqueous solution of 2,4-diamino-5-phenyl thiazole containing hydrochloric acid or hydrobromic acid to a temperature not exceeding about 60° C., forming in situ or adding to the solution an amount of an appropriate inorganic chloride or bromide such as will remain in solution in said solution but which will depress the solubility of the resultant 2,4-diamino-5-phenyl thiazole hydrochloride or hydrobromide salt sufficiently to cause crystallisation of said hydrochloride or hydrobromide salt, cooling the solution, if desired, and recovering said hydrochloride or hydrobromide salt. Thus, in short we have found that amiphenazole can be prepared satisfactorily in water, in good yield and sufficiently pure for use without further treatment, by keeping the temperature of the aqueous solution of base and hydrochloric acid or hydrobromic acid below 60° C. and using an inorganic chloride or bromide to lower the solubility of the hydrochloride or hydrobromide salt in water. The inorganic chloride or bromide used for the purpose conveniently is an alkali metal or ammonium chloride or bromide.

Those skilled in the art will understand that when the hydrochloride salt of 2,4-diamino-5-phenyl thiazole is desired, the base is reacted with hydrochloric acid and the solubility of the salt is depressed by the presence of an inorganic chloride, whilst when the hydrobromide salt of 2,4-diamino-5-phenyl thiazole is desired, the base is reacted with hydrobromic acid and the solubility of the salt is depressed by the presence of an inorganic bromide. For convenience, the following description is essentially limited to a discussion of the production of the hydrochloride salt, however, it is to be understood that the hydrobromide salt can be produced in an equivalent manner and that the processing conditions specified herein are equally applicable to production of the hydrobromide salt.

In the preferred method of opertaion, wet 2,4-diamino-5-phenyl thiazole is slurried in water, and concentrated hydrochloric acid is added until the base has dissolved. The pH is adjusted to about pH 3–4.5 and the solution heated to about 50°–60° C. The solution is preferably treated with an absorption agent, e.g. carbon, and a solution of the inorganic chloride is added. The mixture is then cooled and the 2,4-diamino-5-phenyl thiazole hydrochloride separated and washed. The method permits wide variation in the concentration of the reactants, but the amount of inorganic chloride used must be increased with decreasing concentration of the desired hydrochloride salt, in order to obtain a worthwhile yield of product. Thus, in Example I below, 6.5 moles of ammonium chloride is used per mole of the desired hydrochloride salt (3 g. of ammonium chloride per 2 g. of the desired salt) for an M/3 solution of the desired salt. If this concentration of desired salt is lowered the amount of ammonium chloride must be raised say to 7 or 8 moles, while if it is more concentrated it can be lowered say to 4 or 5 moles. We prefer to carry out the reaction so that in the final solution before the addition of the inorganic chloride there is a concentration of about 0.3 to 0.4 mole/litre of the desired hydrochloride salt and to this is added in solution 5 to 6 moles of inorganic chloride. For general purposes, we prefer to have a concentration of the hydrochloride salt in the range of about 5–12% but the method is not limited to this range.

The preferred method is conveniently carried out by adding the hydrochloric acid to a slurry of the thiazole base or the base may be added to a solution of hydrochloric acid. We prefer to use concentrated hydrochloric acid but any strength of this acid may be used. This reaction may be carried out at any temperature up to about 60° C., however, it is preferred to carry it out at room temperature, in order to avoid decomposition and formation of toxic by-products particularly if the base is added to the acid. When the pH has been adjusted, preferably to pH 4–4.5 as measured on Universal Indicator Paper, it is safe to raise the temperature to about 60° C., but we prefer to limit it to 50–55° C. to ensure that no toxic by-products are formed. The inorganic chloride we prefer to use is ammonium chloride (sodium or potassium chlorides may also be conveniently used) and may be added solid or in aqueous solution. We prefer to dissolve inorganic chloride in hot water so that it may be filtered to remove any contamination. The concentration is preferably high but will depend on the amount of water used in the reaction mixture. Before adding the chloride solution to the reaction mixture, we prefer to treat the reaction mixture with an absorption agent, e.g. carbon, but this is not necessary. After adding the chloride solution, the 2,4-diamino-5-phenyl thiazole hydrochloride usually crystallises out fairly rapidly. The mixture is then preferably cooled to complete the crystallisation and the hydrochloride product is most readily separated by filtration.

Separated hydrochloride product is washed with a small amount of water to remove mother liquor. We prefer then to wash the hydrochloride product with acetone to facilitate drying but this it not essential. The 2,4-diamino-5-phenyl thiazole hydrochloride so obtained can be dried under vacuum without any deterioration in colour or quality and consists of white crystals containing substantially no toxic impurities. The mother liquor and washes may, if desired, be made alkaline and the small amount of hydrochloride product remaining in the liquors recovered as free base and re-used in the method.

According to the invention, amiphenazole is also prepared by converting 2,4-diamino-5-phenyl benzene or alkylated benzene sulphonate to the thiazole base and converting said base into the hydrochloride or hydrobromide salt, by the method which comprises adding 2,4-diamino-5-phenyl thiazole benzene or alkylated benzene sulphonate over a period of at least 0.5 hour to an agitated solution of an alkaline carbonate or alkali metal hydroxide or ammonia at a temperature of from about 40° C. to 60° C., separating the 2,4-diamino-5-phenyl thiazole, heating an aqueous solution of the 2,4-diamino-5-phenyl thiazole containing hydrochloric acid or hydrobromic acid to a temperature not exceeding about 60° C., forming in situ or adding to the solution an amount of appropriately an inorganic chloride or bromide such as will remain in solution but which will depress the solubility of the resultant 2,4-diamino-5-phenyl thiazole hydrochloride or hydrobromide salt sufficiently to cause crystallisation of said hydrochloride or hydrobromide salt, cooling the solution if desired, and recovering said hydrochloride or hydrobromide salt. Thus, we have found that amiphenazole can be prepared satisfactorily in good yield and sufficiently pure for use without further treatment, by adding over a considerable period of time the specified sulphonate salt to an alkaline solution and allowing the components to react at temperatures above room temperature, recovering the thiazole base, reacting an aqueous solution of said thiazole base with hydrochloric or hydrobromic acid at temperatures below about 60° C., and using an inorganic chloride or bromide to lower the solubility of the hydrochloride salt in water.

In the conversion of the specified 2,4-diamino-5-phenyl thiazole benzene sulphonates to the base, we prefer to use sodium or potassium carbonate as the alkaline material since it is difficult to wash the base free of alkali, and, the stronger bases such as potassium and sodium hydroxide appear to hasten the decomposition of the base, nevertheless, these hydroxides or ammonia may be used. We usually prepare an approximately 10% solution of alkali or alkaline carbonate, but higher or lower concentrations can be used. The amount of alkali or alkaline carbonate is not critical, provided that sufficient is present to convert all of the selected benzene sulphonate to the base, although too great an excess of strong alkali will cause some decomposition as indicated. With sodium or potassium carbonate we prefer to use one mole of the carbonate (i.e., two equivalents) per mole of benzene sulphonate.

We prefer to add the selected benzene sulphonate salt to the solution of alkali over 0.75 hr. to 1 hr. although less time may be used if stirring is very efficient. Longer periods may be used, but the product may undergo some decomposition. We prefer to carry out the reaction in the range of 45–50° C. Lower temperatures may result in incomplete conversion while higher temperatures, particularly above 70° C., lead to rapid decomposition. After the addition is complete, we prefer to stir a further 15 minutes to ensure completeness of reaction, but this is not necessary if a test of solubility in acetone indicates that the reaction is complete. Longer times may be used, but may result in some decomposition of the product.

The base produced is most readily separated by filtration, and should be washed thoroughly with cold water to remove as much of the alkaline mother liquor as possible. The base so obtained should be converted into the hydrochloride salt as soon as possible, preferably immediately, in order to avoid decomposition, which slowly takes place.

The invention is illustrated by the following practical examples, in which Example I is on laboratory scale, Example II is a plant batch, and Examples III and IV describe previous methods for comparison purpose.

*Example I*

A solution of 1330 grams of sodium carbonate in 13,000 ml. of water is heated to 45–50° C. and stirred. 2,220 grams of 2,4-diamino-5-phenyl thiazole benzene sulphonate is added over 45–60 minutes and stirred for 15 minutes at the end of the addition. The precipitated 2,4-diamino-5-phenyl thiazole is filtered off and washed thoroughly with water. A sample tested in acetone dissolves completely indicating that the reaction was complete.

The thiazole product is stirred wet with 9,150 ml. of water and concentrated hydrochloric acid is slowly added until the pH remains at pH 4–4.5 measured on Universal Indicator Paper. The volume is adjusted to 16,000 ml. with water and heated to 50–55° C. The solution is carbon treated at 50–55° C. A solution of 1860 grams of ammonium chloride in 3820 mls. of water at 95° C. is filtered and added to the reaction solution. Crystallisation occurs and the mixture is cooled to about 25° C. and filtered. The hydrochloride product is washed with about 750 ml. of water and then with about 75 ml. of acetone and is then dried under vacuum at 60° C. A yield of 1190 grams of 2,4-diamino-5-phenyl thiazole hydrochloride is obtained. The product is white, assays 99.6% pure and a toxicity test indicates no toxic impurities.

The mother liquor and washes are made alkaline and the precipitated 2,4-diamino-5-phenyl thiazole is filtered off and re-used in the process, yielding a further 30 grams of hydrochloride product.

*Example II*

The method of Example I was carried out by adding 145 lb. of 2,4-diamino-5-phenyl thiazole benzene sulphonate to a solution of 87 lbs. of soda ash in 85 gals. of water at 45° C. The product so obtained, which was completely acetone-soluble, was slurried in 100 gals. water and heated to 50° C., the pH adjusted to pH 4.0–4.5 with hydrochloric acid and the solution carbon treated. A solution of 118 lb. of ammonium chloride in 25 gals. water at 95° C. was filtered and charged into the reaction solution. The slurry of hydrochloride was cooled to 25° C., centrifuged, the product washed with water and acetone, and then dried in a vacuum oven at 60° C. The 2,4-diamino-5-phenyl thiazole hydrochloride obtained was white and contained no toxic impurities.

*Example III*

873 grams of 2,4-diamino-5-phenyl thiazole benzene sulphonate are thoroughly mixed with 600 ml. of dilute (1:1) ammonium hydroxide. The solid product is separated by filtration and washed thoroughly with water. When tested with acetone, a considerable amount remains undissolved, indicating that unchanged starting material is present.

*Example IV*

2,4-diamino-5-phenyl thiazole, produced from 70 g. of the benzene sulphonate salt by the method described in Example I, and free of acetone insoluble impurity, was dissolved in alcohol and saturated with hydrochloric acid gas. The precipitated salt was filtered off. After drying the product was obtained in only 74% yield and was pale green in colour. The colour deepened on standing.

Advantages of the method of the invention are the substantially complete conversion of the 2,4-diamino-5-phenyl thiazole benzene sulphonate to the free base; elimination of the drying of the free base, which cannot be carried out on large scale by known methods; elimination of solvents in the conversion of the free base to the hydrochloride, which otherwise results in a product of variable colour; and, use of the wet base without large yield losses and without the formation of toxic by-products which otherwise make the product unusable.

We claim:

1. Process for the preparation of 2,4-diamino-5-phenyl thiazole hydrochloride and hydrobromide salts in high yield and substantially free from toxic by-products, which comprises mixing 2,4-diamino-5-phenyl thiazole with an aqueous solution of an acid selected from hydrochloric and hydrobromic acids, correcting the pH of the resultant solution so as to be between about pH 3–4.5, heating the resultant solution to a temperature between about 50–60° C., adding to the resultant solution an aqueous solution containing an amount of an appropriate inorganic salt selected from inorganic chlorides and inorganic bromides such as will remain in solution in the mixture of these solutions but which will depress the solubility of the resultant 2,4-diamino-5-phenyl thiazole salt selected from the hydrochloride and hydrobromide salts sufficiently to cause crystallization of said 2,4-diamino-5-phenyl thiazole salt, cooling said mixture of solutions to complete crystallization of the desired 2,4-diamino-5-phenyl thiazole salt, and recovering the crystals of said 2,4-diamino-5-phenyl thiazole salt from the solution.

2. Process according to claim 1, wherein said temperature is within the range of about 50–55° C.

3. Process according to claim 1, wherein the aqueous solution of 2,4-diamino-5-phenyl thiazole containing an acid selected from hydrochloric and hydrobromic acids has a concentration of said components such that there is present in said solution a concentration of about 0.3 to 0.4 mole/litre of the desired 2,4-diamino-5-phenyl thiazole salt, and there is added to said solution an aqueous solution containing about 5 to 6 moles of the inorganic salt.

4. Process according to claim 1, wherein the concentration of the desired 2,4-diamino-5-phenyl thiazole salt in the solution before crystallization of said salt is in the range of about 5–12%.

5. Process according to claim 1, wherein said inorganic salt is selected from alkali metal chlorides, alkali metal bromides, ammonium chloride, and ammonium bromide.

6. Process for the preparation of 2,4-diamino-5-phenyl thiazole hydrochloride and hydrobromide salts in high yield and substantially free from toxic by-products, which comprises converting a sulfonate selected from 2,4-diamino-5-phenyl thiazole benzene sulfonate and alkylated 2,4-diamino-5-phenyl thiazole benzene sulfonates to the equivalent thiazole base by adding such a sulfonate during a period of at least 0.5 hour to an alkaline solution selected from alkali metal carbonate, alkali metal hydroxide, and ammonia solutions at a temperature within the range of about 40–60° C., separating the resultant 2,4-diamino-5-phenyl thiazole from the solution, mixing said separated 2,4-diamino-5-phenyl thiazole with an aqueous solution of an acid selected from hydrochloric and hydrobromic acids, correcting the pH of the resultant solution so as to be between about pH 3–4.5, heating the resultant solution to a temperature between about 50–60° C., adding to the resultant solution an aqueous solution containing an amount of an appropriate inorganic salt selected from inorganic chlorides and inorganic bromides such as will remain in solution in the mixture of these solutions but which will depress the solubility of the resultant 2,4-diamino-5-phenyl thiazole salt selected from the hydrochloride and hydrobromide salts sufficiently to cause crystallization of said 2,4-diamino-5-phenyl thiazole salt, cooling said mixture of solutions to complete crystallization of the desired 2,4-diamino-5-phenyl thiazole salt, and recovering the crystals of said 2,4-diamino-5-phenyl thiazole salt from the solution.

7. Process according to claim 6, wherein said temperature is within the range of about 50–55° C.

8. Process according to claim 6, wherein the aqueous solution of 2,4-diamino-5-phenyl thiazole containing an acid selected from hydrochloric and hydrobromic acids has a concentration of said components such that there is present in said solution a concentration of about 0.3 to 0.4 mole/litre of the desired 2,4-diamino-5-phenyl thiazole salt, and there is added to said solution an aqueous solution containing about 5 to 6 moles of the inorganic salt.

9. Process according to claim 6, wherein the concentration of the desired 2,4-diamino-5-phenyl thiazole salt in the solution before crystallization of said salt is in the range of about 5–12%.

10. Process according to claim 6, wherein said inorganic salt is selected from alkali metal chlorides, alkali metal bromides, ammonium chloride, and ammonium bromide.

References Cited by the Examiner

UNITED STATES PATENTS 2,709,172 5/1955 Dodson ---------- 260—306.8

OTHER REFERENCES

MacArdle: The Use of Solvents in Synthetic Organic Chemistry (Van Nostrand Co., 1925), pages 158–167.

Weissberger: Technique of Organic Chemistry, vol. III, part I, Separation and Purification (Interscience, 1956), pages 471–472, 474–475, 518, and 746–748.

NICHOLAS S. RIZZO, *Primary Examiner.*